United States Patent
Carmon et al.

(10) Patent No.: US 7,738,369 B2
(45) Date of Patent: Jun. 15, 2010

(54) DATA STRUCTURE CACHING FOR PDU RE-GENERATION AND TRANSMISSION IN A 3G WIRELESS NETWORK

(75) Inventors: Rafael Carmon, Rishon Le Zion (IL); Ido Gazit, Haifa (IL); Simon Issakov, Bethlehem, PA (US); Vladimir Kopilevitch, Tel-Aviv (IL)

(73) Assignee: Agere Systems Inc., Allentown, PA (US)

( * ) Notice: Subject to any disclaimer, the term of this patent is extended or adjusted under 35 U.S.C. 154(b) by 664 days.

(21) Appl. No.: 11/623,906

(22) Filed: Jan. 17, 2007

(65) Prior Publication Data

US 2008/0170516 A1 Jul. 17, 2008

(51) Int. Cl.
*H04L 12/26* (2006.01)
*H04L 1/00* (2006.01)

(52) U.S. Cl. .......... 370/230; 370/235; 370/278; 370/282; 370/469

(58) Field of Classification Search .......... 370/310, 370/345, 349, 230, 235, 277, 278, 282, 334, 370/342, 469
See application file for complete search history.

(56) References Cited

U.S. PATENT DOCUMENTS

| 2005/0265301 A1* | 12/2005 | Heo et al. | 370/349 |
|---|---|---|---|
| 2006/0013268 A1 | 1/2006 | Terry | |
| 2006/0146761 A1* | 7/2006 | Kim et al. | 370/335 |
| 2007/0109964 A1* | 5/2007 | Kwak et al. | 370/230 |

OTHER PUBLICATIONS

3GPP TS 25.321 V7.3.0, 3rd Generation Partnership Project; Technical Specification Group Radio Access Network; Medium Access Control (MAC) protocol specification (Release 7), Dec. 2006, Revelant pp. 7, 18, 26, 37, 93.*

"3rd Generation Partnership Project; Technical Specification Group Radio Access Network: Medium Access Control (MAC) Protocol Specification (Release 7)," 3GPP (3rd Generation Partnership Project) TS 25.321, V7.2.0 (Sep. 2006) Technical Specification, 3GPP Organisational Partners Publications, [Retrieved on Nov. 8, 2006], Retrieved from the Internet: <URL: http://www.3gpp.org/ftp/Specs/html-info/25321.html> (p. 113).

(Continued)

*Primary Examiner*—Rafael Pérez-Gutiérrez
*Assistant Examiner*—Neda Behrooz
(74) *Attorney, Agent, or Firm*—Mendelsohn, Drucker & Associates, P.C.; Edward J. Meisarosh; Steve Mendelsohn (57) ABSTRACT

In one embodiment, a transmitter (a) caches one or more MAC-d PDUs received from a network layer, (b) selects a subset of the MAC-d PDUs for combination into a MAC-e PDU, (c) generates the MAC-e PDU from the subset of selected MAC-d PDUs, (d) caches a data structure to allow re-generation of the MAC-e PDU, wherein the re-generation does not rely on any cached copy of the MAC-e PDU, (e) transmits the MAC-e PDU for receipt by a receiver; and (f) determines whether an ACK was received, wherein if an ACK was not received, then the MAC-e PDU is re-generated using the cached data structure and the subset of selected MAC-d PDUs, and steps (e) and (f) are repeated, and if an ACK was received, then the memories used to cache the data structure and the first subset of MAC-d PDUs are freed.

17 Claims, 4 Drawing Sheets

OTHER PUBLICATIONS

Zahid Ghadialy, "Tutorial: Medium Access Control (MAC) in 3G/UMTS Protocol Stack," 2005 [Retrieved on Dec. 5, 2006], Retrieved from the Internet: <URL: http://3g4g.co.uk/Tutorial/ZG/zg_mac.html> (9 pages).

* cited by examiner

DATA STRUCTURE CACHING FOR PDU RE-GENERATION AND TRANSMISSION IN A 3G WIRELESS NETWORK

BACKGROUND OF THE INVENTION

1. Field of the Invention

The present invention relates to wireless communication systems, and more particularly to transmission protocols used by third-generation (3G) wireless communication systems.

2. Description of the Related Art

One category of mobile telephony communication devices, or mobile phones, includes third-generation devices. Third-generation (3G) mobile phones use digital radio signals for communication between mobile phones and cell towers, also known as base stations. Third-generation mobile phones are able to simultaneously transfer multiple data streams, such as voice, e-mail, instant messages, and streaming audio or video. These data streams may have different Quality-of-Service (QoS) characteristics and requirements. Third-generation mobile phones additionally allow for high rates of data transfers and broadband capabilities. The high rates of data transfer rely on efficient organization and transmission of data to and from the applications running on a mobile phone. The organization and transmission of data is defined by protocols and standards.

Third-generation mobile phone standards are set by the Third Generation Partnership Project (3GPP) and are based on the Universal Mobile Telecommunications System (UMTS) network technology. UMTS evolved from Global System for Mobile Communication (GSM) network technology, and UMTS might use GSM core networks. The 3GPP comprises several Technical Specification Groups (TSGs) that are responsible for various areas of third-generation technology. One way to categorize 3G technology is by layer levels and protocols. The 3G protocol stack includes at least three layers: (i) layer 1, also known as the physical layer, (ii) layer 2, also known as the data link layer, and (iii) layer 3, also known as the network layer. The network layer handles communication with applications on the mobile phone, the physical layer handles communication between a mobile phone and a base station, while the data link layer interfaces between the network and physical layers.

Figure 1:
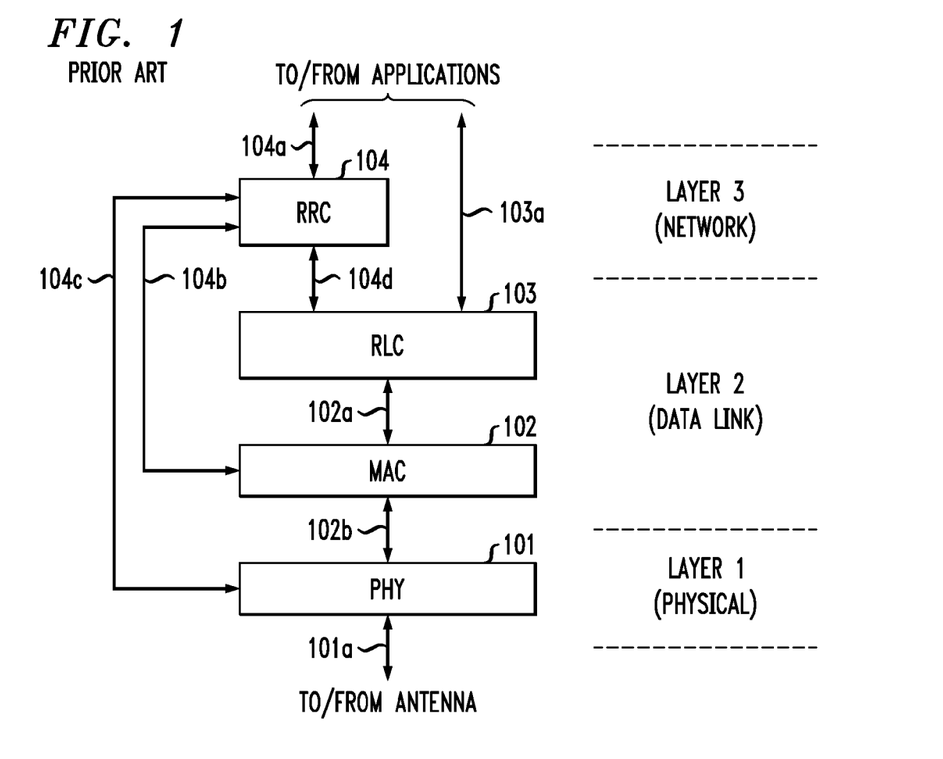
FIG. 1 shows a simplified partial block diagram of the 3G protocol stack.

FIG. 1 shows a simplified partial block diagram of the 3G protocol stack. The various communication paths shown can be direct or indirect and can include intermediary elements which are not shown in the figure or described herein. Layer 1 comprises physical layer 101, which communicates with an antenna via path 101*a* and with layer 2 via path 102*b*. Path 102*b* comprises transport channels. Transport channels are data flows between the data link layer and the physical layer. Data in the transport channels is organized into packets. Transport channels can then be combined onto composite transport channels for radio transmission between a mobile phone and a base station using physical layer 101. Transport Format Combination Indicators (TFCI) are transmitted along with channel data in order to indicate to the receiver how to identify, decode, de-multiplex, and deliver the transmission it receives.

Layer 2 comprises Media Access Control (MAC) layer 102 and Radio Link Control (RLC) layer 103, which communicate via path 102*a*, which comprises logical channels. Logical channels are data flows within layer 2 associated with applications running on the wireless device. Each logical channel has an associated QoS. The data flows are organized into packets in the logic channels. Logical channels are mapped, i.e., multiplexed, to transport channels within layer 2. A particular transport channel can support logical channels with different QoS parameters.

Layer 3 includes Radio Resource Controller (RRC) entity 104, which controls and communicates with physical layer 101, MAC layer 102, and RLC layer 103 via paths 104*c*, 104*b*, and 104*d*, respectively. RRC 104 communicates with applications running on the mobile phone via path 104*a*. RLC layer 103 can also communicate with applications running on the mobile phone via path 103*a*, either directly or through intermediary entities (not shown) in layer 3. Layer 3 includes other entities (not shown), as well.

Layer 2 architecture and design is regulated by Working Group 2 (WG2) of the Radio Access Network (RAN) TSG, which is in charge of the Radio Interface architecture and protocols (MAC, RLC, Packet Data Convergence Protocol (PDCP)), the specification of the Radio Resource Control protocol, the strategies of Radio Resource Management, and the services provided by the physical layer to the upper layers. Among the technical specifications (TS) provided by WG2 RAN TSG is TS 25.321, which is the MAC protocol specification. TS 25.321 is occasionally updated and multiple releases are published, in conjunction with new releases of the 3G standard. A list of releases of TS 25.321 is available on the Internet at the 3GPP website. The MAC protocol specifies, among other things, (i) communication channels and (ii) protocol data units, formats, and parameters, for communication between the physical layer and the RLC layer of a mobile phone.

Release 6 of the 3GPP standard introduced the high-speed uplink packet access (HSUPA) protocol, which allows for the high-speed transmission of data from a mobile telephony device, referred to as user equipment (UE), to a base station, referred to as a Node-B, which is part of the UMTS Terrestrial Radio Access Network (UTRAN). Release 7 of the 3GPP also includes the HSUPA protocol, and later releases are expected to include it as well.

The HSUPA protocol employs (i) a shorter Transmission Time Interval (TTI) than other transport channels and (ii) a faster Hybrid Automatic Repeat Request (HARQ) mechanism. TTI refers to the length, typically in milliseconds, of an independently-decodable radio transmission. TTI is one representation of a transport block. Different transmission channels with different Quality of Service (QoS) parameters typically have different TTIs. HARQ is an error-control retransmission mechanism, which allows for the retransmission of a data packet that was not received as intended by the receiver. HSUPA uses HARQ with a Stop and Wait (SAW) protocol, wherein a process associated with a particular payload stops and waits for an acknowledgement (ACK) from the receiver indicating a successful receipt by the receiver, a negative acknowledgment (NACK) from the receiver indicating an unsuccessful receipt by the receiver, or the expiration of a defined waiting time in the case where neither an ACK nor a NACK are received from the receiver.

The HSUPA protocol uses an uplink Enhanced Dedicated Transport Channel (E-DCH), which is controlled by MAC-layer entities called MAC-e and MAC-es, which might be combined into one MAC-e/es entity. The HSUPA-related functions of the MAC layer include: (i) mapping between logical channels and transport channels, (ii) selection of appropriate transport format for each transport channel depending on instantaneous source rate, (iii) multiplexing/demultiplexing of upper-layer protocol data units (PDUs) into/from transport blocks delivered to/from the physical layer on common and dedicated transport channels, (iv) control of E-DCH transmission and reception, including support of a Hybrid Automatic Repeat Request (HARQ) mechanism, and (v) generation of uplink scheduling information to assist with E-DCH resource allocation.

Figure 2:
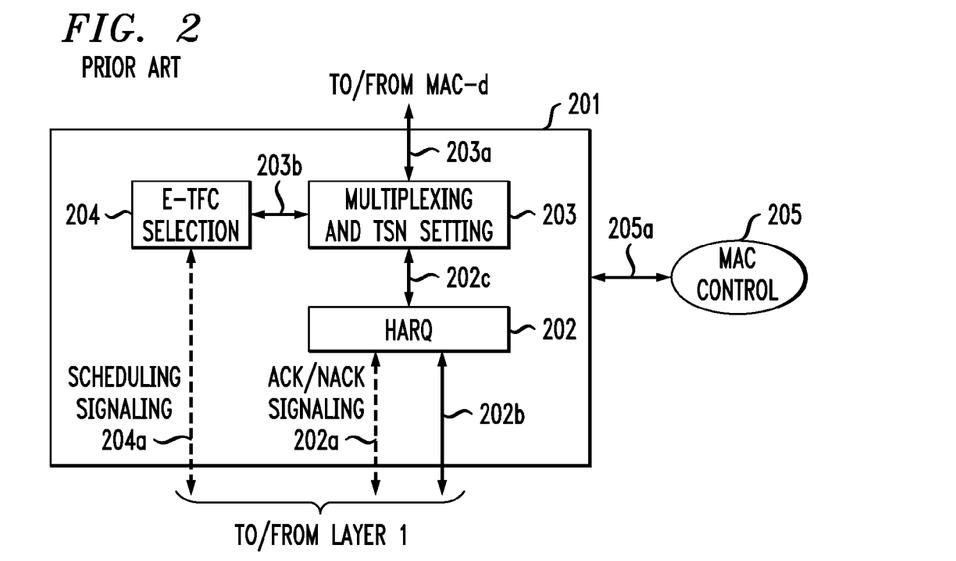
FIG. 2 shows a simplified block diagram of the architecture of a UE-side MAC-e/es entity.

FIG. 2 shows a simplified block diagram of the architecture of UE-side MAC-e/es entity 201 in accordance with Release 7 of the 3G standard. MAC-e/es entity 201 controls access to the E-DCH transport channel and handles functions specific to the E-DCH, such as described below for its component entities. MAC-e/es entity 201 comprises HARQ entity 202, multiplexing entity 203, and E-DCH Transport Format Combination (E-TFC) selection entity 204. MAC-e/es entity 201 is controlled by MAC control entity 205 via path 205a. HARQ entity 202 communicates with layer 1 via paths 202a and 202b. Path 202a is used for ACK/NACK signaling, while path 202b is used for traffic, including MAC-e payloads. HARQ entity 202 communicates with multiplexing entity 203 via path 202c, which transports MAC-e payloads. HARQ entity 202 is responsible for storing MAC-e payloads and re-transmitting them if necessary.

The HARQ mechanism allows a Node-B to rapidly request retransmission of erroneous uplink transport blocks until they are successfully received. In order to better use the time between acknowledgements, multiple processes can run for the same receiver using separate TTIs. This is called N-channel SAW (Stop and Wait). While one or more channels of the N channels are all awaiting an acknowledgement, the remaining channels can continue to transmit. Using HARQ, the receiver does not discard the information from failed transmissions, as is done with conventional Automatic Repeat Request (ARQ). Instead, the receiver stores and later combines the information from a failed transmission with the retransmission(s) to increase the probability of successful decoding. A HARQ entity, responsible for handling the MAC functions relating to the HARQ mechanism, is present in one or more MAC entities, which are located in the MAC layer.

E-TFC selection entity 204 of FIG. 2 communicates scheduling information with a Node-B via layer 1 and path 204a. E-TFC selection entity 204 is responsible for E-TFC selection according to the scheduling information received from the Node-B and MAC control entity 205. E-TFC selection entity 204 is responsible for arbitration among the different data flows mapped on the E-DCH channel. E-TFC selection entity 204 also controls the multiplexing function of multiplexing entity 203 by selecting which received MAC-d PDUs are to be multiplexed into each particular MAC-e PDU payload.

Multiplexing entity 203 communicates with a MAC-d entity (not shown) via path 203a, which transmits MAC-d protocol data units (PDUs). The MAC-d entity controls access to all dedicated transport channels. Multiplexing entity 203 is responsible for concatenating selected MAC-d PDUs into MAC-es PDUs, and multiplexing the one or more resultant MAC-es PDUs into a single MAC-e payload, to be transmitted in a next TTI, as instructed by E-TFC selection entity 204, via path 203b. All the MAC-d PDUs in a single MAC-es PDU are of the same size and come from the same logical channel. The size and logical channel for the MAC-d PDUs in a MAC-es PDU are indicated by a Data Description Indicator (DDI). Multiplexing entity 203 is also responsible for managing and setting the Transmission Sequence Number (TSN) per logical channel for each MAC-es PDU.

Figure 3:
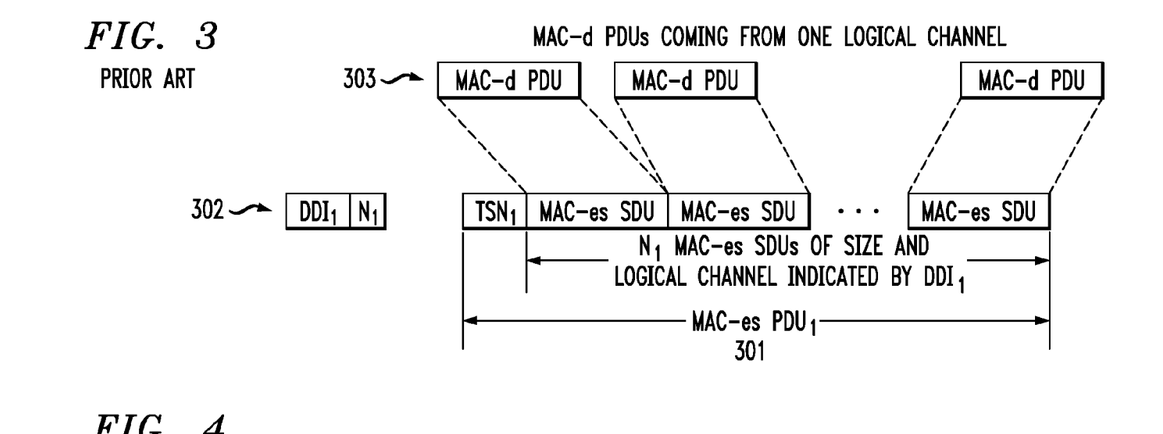
FIG. 3 shows an exemplary MAC-es PDU in accordance with the 3G standard.

FIG. 3 shows exemplary MAC-es $PDU_1$ 301 in accordance with the 3G standard. A MAC PDU in general is a bit string of variable length. A MAC PDU comprises an optional MAC header and a MAC Service Data Unit (SDU). Both the MAC header and the MAC SDU are of variable length. The content and the size of the MAC header depends on the type of the associated logical channel, and in some cases none of the parameters of the MAC header are needed.

MAC-es $PDU_1$ 301 comprises a header with a TSN and an SDU section comprising $N_1$ MAC-es SDUs, wherein $N_1$ is an integer and each MAC-es SDU comprises a MAC-d PDU, such as MAC-d PDU 303, received from a MAC-d entity. Data entity 302 comprises $DDI_1$ and $N_1$. $DDI_1$ contains the DDI information for MAC-es $PDU_1$ 301, and $N_1$ is the number of MAC-es SDUs in MAC-es $PDU_1$ 301. Data entity 302 and MAC-es $PDU_1$ 301 are then combined with other data entities and MAC-es PDUs to form a MAC-e payload, also called a PDU.

Figure 4:
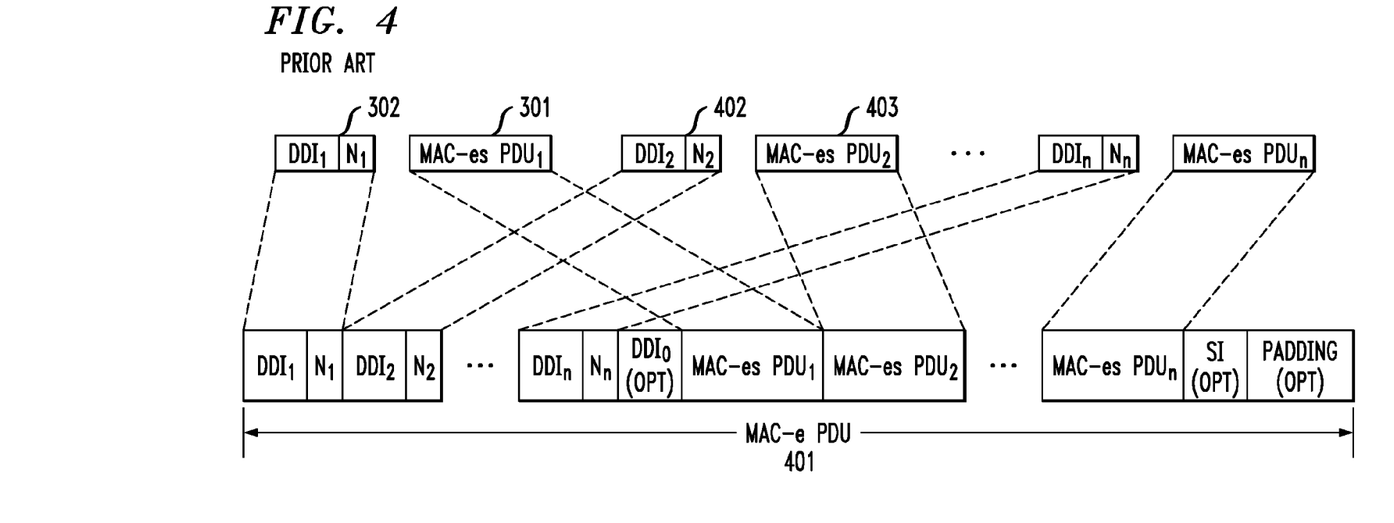
FIG. 4 shows an exemplary MAC-e PDU in accordance with the 3G standard.

FIG. 4 shows exemplary MAC-e PDU 401 in accordance with the 3G standard. MAC-e PDU 401 comprises $N_n$ MAC-es PDUs, wherein $N_n$ is an integer, and further comprises a header section comprising the data entities of those $N_n$ MAC-es PDUs. MAC-e PDU 401 might optionally comprise additional header information, Scheduling Information (SI), and padding. MAC-e PDU includes data entity 302 and MAC-es $PDU_1$ 301 from FIG. 3, as well as ($N_n$−1) other data entities and MAC-es PDUs, such as MAC-es $PDU_2$ 403 and its affiliated data entity 402. The MAC-d PDUs included in MAC-es $PDU_2$ 403 can be from a logical channel the same as or different from the logical channel of the MAC-d PDUs included in MAC-es $PDU_1$ 301. MAC-e PDU 401 is adapted to be transmitted in a single TTI.

The TTI for HSUPA operation can be a mere 2 msec. The short duration of the TTI ensures that the channel conditions are likely to remain substantially fixed during a single TTI. However, the short duration is demanding on the User Equipment (UE) because it needs to process a whole MAC-e payload of data in less than 2 msec. Specifically, the UE needs to (i) select an E-TFC, (ii) concatenate and multiplex MAC-d PDUs into a single MAC-e payload, which can involve many bit-shifting operations, (iii) set and manage a TSN, and (iv) handle HARQ functions, including storing and retransmitting MAC-e payloads. These operations might require more complex processors and/or greater power consumption than pre-HSUPA operations do.

Figure 5:
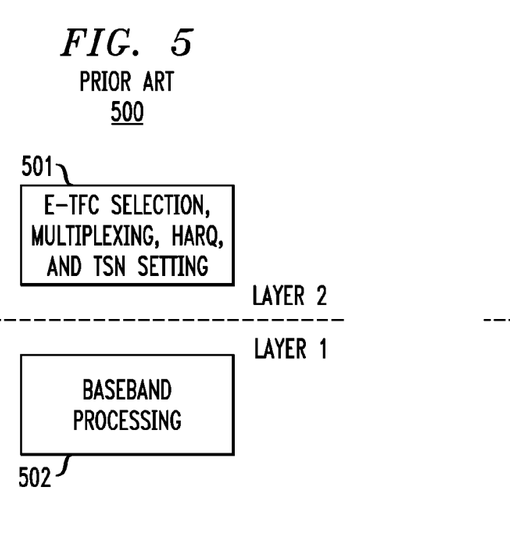
FIG. 5 shows a simplified block diagram of part of a prior-art UE showing processor relationship to protocol-stack layers.

FIG. 5 shows a simplified block diagram of part of prior-art UE 500 showing processor relationship to protocol-stack layers. Different processors may be associated with different layers of the 3G protocol stack. For example, MAC-e functionality is typically implemented in a Protocol Stack (PS) processor, such as PS processor 501. Thus, one task of PS processor 501 is to multiplex and concatenate MAC-d PDUs.

The size of a MAC-e header depends on the number of logical channels, i.e., MAC-d flows, that are multiplexed in the associated MAC-e PDU. The MAC-e header contains 18 bits for every MAC-d flow. Thus, MAC-e header size is variable and can change from one TTI to the next, and typically is not a multiple of 8 bits, i.e., is not byte-multiple. MAC-d PDUs, on the other hand, are aligned to byte-multiple memory address, e.g., 8-, 16-, or 32-bit memory addresses. The MAC-d PDUs should be concatenated immediately following the header. Since MAC-e header size is variable and MAC-d PDUs can start in the middle of a byte, it may be necessary to shift all the MAC-d PDUs by a few bits for the concatenation. Thus, the concatenation of MAC-d PDUs might involve many bit-shifting operations. This shifting might be an inefficient and time-and-effort-costly procedure for a PS processor designed to operate with multi-byte words.

Layer 1 processor 502 is a baseband processor, which is a type of DSP, and is designed to efficiently handle bit-shifting operations. Layer 1 processor 502 performs baseband processing, which includes modem-like functionality for UE 500. In general, operations in layer 1 processor 502 are bit-oriented, while operations in PS processor 501 are byte- and word-, i.e., multi-byte memory unit, oriented.

The memory of PS processor 501 comprises the retransmission buffer required by the HARQ entity, such as HARQ entity 202 of FIG. 2, for storing MAC-e payloads if retransmission becomes necessary. PS processors, such as PS processor 501, are typically implemented using Advanced RISC Machine (ARM) processors.

SUMMARY OF THE INVENTION

In one embodiment, the invention is a transmitter for a communication network further comprising a receiver. In another embodiment, the invention is a method for data transmission in a communication network comprising a transmitter and a receiver. One or more first-type protocol data units (PDUs) received at a data link layer of the transmitter from a network layer of the transmitter are cached in memory. A first subset of the one or more first-type PDUs is selected for combination into a second-type PDU. The second-type PDU is generated from the first subset of one or more selected first-type PDUs. A data structure adapted to allow re-generation of the second-type PDU, wherein the re-generation does not rely on any cached copy of the second-type PDU, is cached in memory. The second-type PDU is transmitted via a physical layer of the transmitter for receipt by the receiver. It is determined whether the transmitter received an acknowledgement of successful receipt of the second-type PDU by the receiver. If the transmitter did not receive the acknowledgement of successful receipt, then the second-type PDU is re-generated using the cached data structure and the first subset of one or more selected first-type PDUs, and the transmitting and determining steps are repeated. If the transmitter did receive the acknowledgement of successful receipt, then the memory used to cache the data structure and the memory used to cache the first subset of one or more selected first-type PDUs are freed.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In assigning tasks to processors in multi-processor systems, system designers generally prefer to assign the performance of bit-shifting operations, such as those that might be required by multiplexing and concatenating MAC-d PDUs, to processors with high MIPS (millions of instructions per second) ratings, since those processors are likely to perform those operations efficiently. Multiple bit-shifting operations can be exhaustive for a PS (protocol stack) processor. The operation of a UE (user equipment) might be more efficient if the multiplexing and concatenating functions of the UE were performed by a layer 1 processor rather than a PS processor. However, implementing multiplexing and concatenating functionality in a layer 1 processor would, in accordance with the 3G standard, require that the lower-level HARQ functionality also be implemented in the layer 1 processor. Implementing HARQ functionality, however, requires a large buffer memory in which to cache transmitted MAC-e payloads while awaiting ACK responses from a Node-B. As noted above, layer 1 processors do not typically have sufficiently large memories to sufficiently buffer MAC-e payloads. Redesigning the layer 1 processor to have a larger memory might introduce new inefficiencies to the UE that counter the efficiency gained from moving the multiplexing and concatenating to the layer 1 processor.

Figure 6:
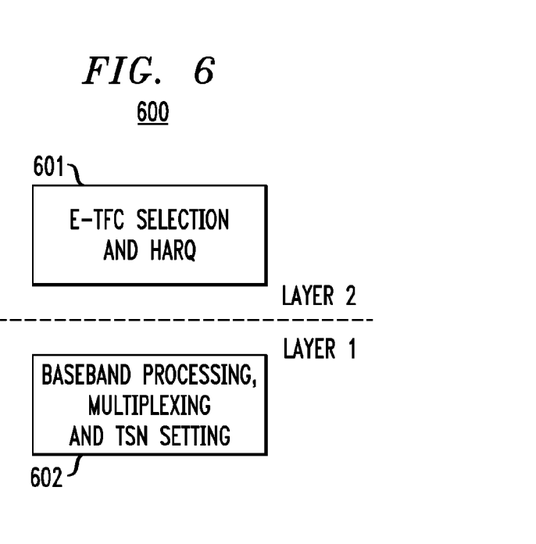
FIG. 6 shows a simplified block diagram of part of an exemplary UE, in accordance with one embodiment of the present invention, showing processor relationship to protocol-stack layers.

FIG. 6 shows a simplified block diagram of part of exemplary UE 600, in accordance with one embodiment of the present invention, showing processor relationship to some protocol-stack layers. UE 600 performs the MAC-e/es functions in a different way from UE 500 of FIG. 5. UE 600 comprises PS processor 601, which performs the E-TFC selection and HARQ functions of a MAC-e/es entity, such as MAC-e/es entity 201 of FIG. 2. UE 600 also comprises layer 1 processor 602, which, along with baseband functionality, performs the multiplexing and concatenating function of a MAC-e/es entity, as well as the related TSN-setting function. PS processor 601 operates as part of layer 2, while layer 1 processor 602 operates as part of layer 1. The functions of some MAC-e/es elements in UE 600 are modified from the standard functions of those elements in a standard MAC-e/es entity in order to accommodate the rearrangement of those entities in UE 600.

Figure 7:
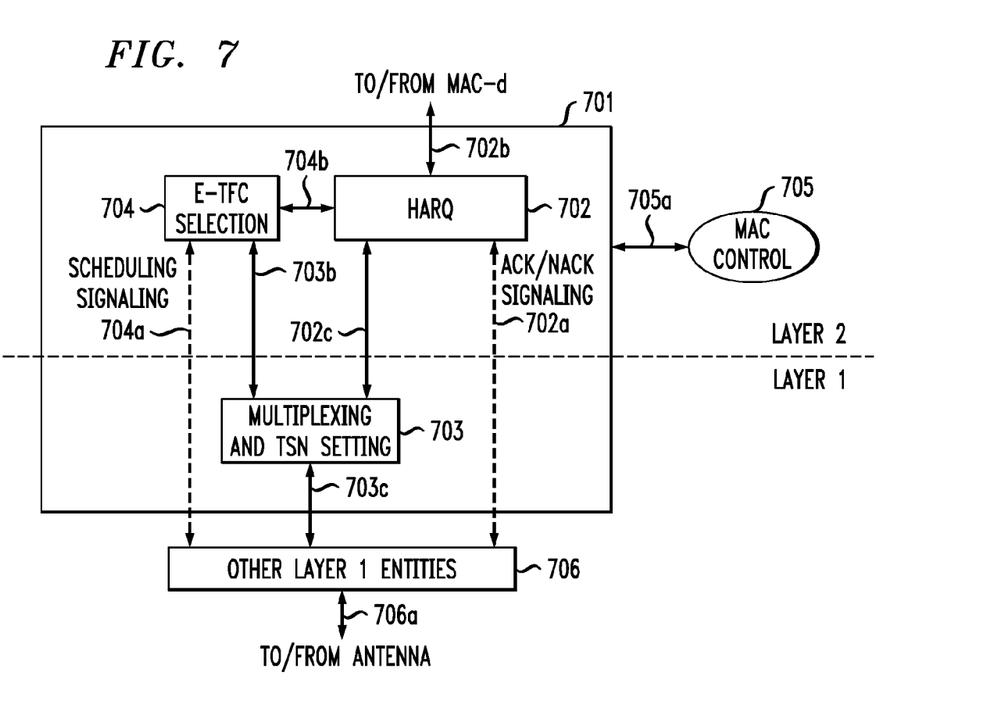
FIG. 7 shows a simplified block diagram of the architecture of a modified UE-side MAC-e/es entity in accordance with an embodiment of the invention.

FIG. 7 shows a simplified block diagram of the architecture of modified UE-side MAC-e/es entity 701 in accordance with an embodiment of the invention. Elements in FIG. 7 that are similar in name, function, and operation to elements in FIG. 2 have been similarly labeled, but with a different prefix. MAC-e/es entity 701 extends into both layers 1 and 2. MAC-e/es entity 701 comprises E-TFC selection entity 704 and HARQ entity 702 in layer 2. MAC-e/es entity 701 also comprises, in layer 1, multiplexing entity 703, which performs multiplexing, concatenation, and TSN setting. The operation of MAC-e/es entity 701 is controlled by MAC control entity 705 via path 705a. HARQ entity 702 communicates with a MAC-d entity (not shown) via path 702b, communicates with multiplexing entity 703 via path 702c, communicates with E-TFC selection entity 704 via path 704b, and communicates ACK/NACK signaling information via path 702a. E-TFC selection entity 704 communicates with multiplexing entity 703 via path 703b, and transceives scheduling signaling via path 704a. Multiplexing entity 703 communicates with lower-layer elements of layer 1 entities group 706 via path 703c. Paths 704a, 703c, and 702a go between MAC-e/es entities and layer 1 entities group 706, which comprises layer 1 entities other than multiplexing entity 703. Layer 1 entities group 706 communicates with a UE antenna (not shown) via path 706a.

Figure 8:
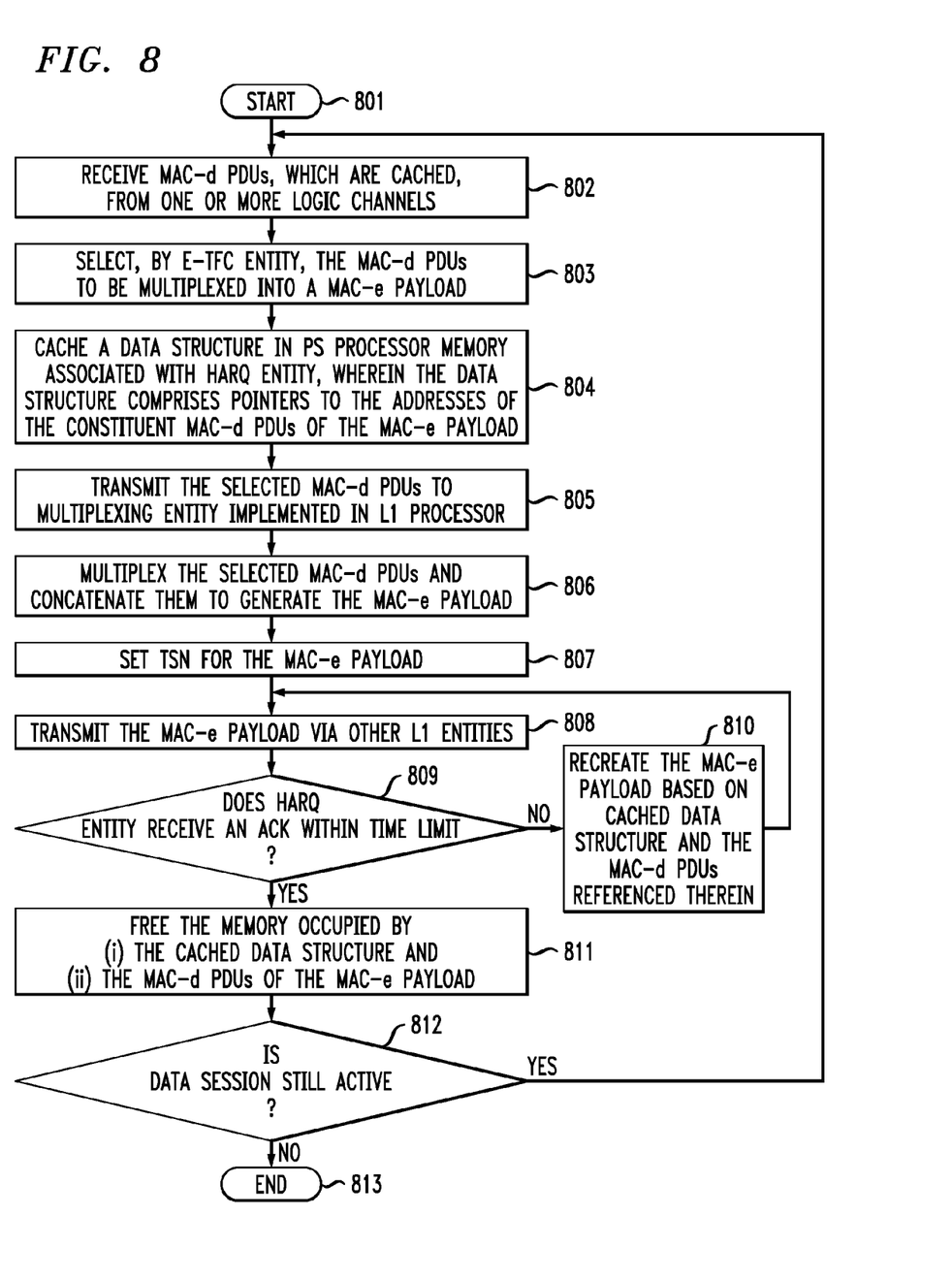
FIG. 8 shows a sample flow chart of an exemplary method of operation of the MAC-e/es entity of FIG. 7.

FIG. 8 shows a sample flow chart of an exemplary method of operation of MAC-e/es entity 701 of FIG. 7. Following the start of the method (step 801), a data session is active and MAC-e/es entity 701 receives MAC-d PDUs, which are cached, from one or more logic channels via path 702b (step 802). E-TFC selection entity 704 determines which of the received MAC-d PDUs are to be transmitted in the next TTI on a MAC-e payload (step 803). In step 804, MAC-e/es entity 701 caches a data structure in PS processor memory associated with HARQ entity 702, wherein the data structure comprises pointers to the addresses of the constituent MAC-d PDUs of the MAC-e payload, i.e., the MAC-d PDUs selected by E-TFC selection entity 704. Pointers provide a way to access a memory section by reference. A pointer is typically implemented as an item that identifies the location, i.e., address, of the memory section to be accessed using the pointer. The selected MAC-d PDUs are transmitted to multiplexing entity 703, which is implemented in the layer 1 processor (step 805). Multiplexing entity 703 multiplexes and concatenates the selected MAC-d PDUs into a MAC-e payload (step 806) and sets the TSN for the MAC-e payload (step 807).

The MAC-e payload is transmitted to the appropriate layer 1 entity in layer 1 entities group 706 via path 703c, and subsequently from layer 1 entities group 706 to the UE antenna via path 706a (step 808). HARQ entity 702 awaits the receipt, via path 702a, of an ACK or NACK for the transmitted MAC-e payload (step 809). If a NACK is received, or if the preconfigured time limit expires (step 809), then MAC-e/es entity 701 recreates the transmitted MAC-e payload within multiplexing entity 703 by using the cached data structure and the MAC-d PDUs referenced therein (step 810), and returns the process to the transmission step (step 808). If an ACK is received within the preconfigured time limit (step 809), then MAC-e/es entity 701 frees the memory occupied by (i) the cached data structure and (ii) the constituent MAC-d PDUs of the transmitted MAC-e payload (step 811). After step 811, it is determined whether the data session is still active, and if so, then the process returns to the receiving MAC-d PDUs step (step 802); otherwise, the process terminates (step 813). In some embodiments, if the data session is still active, but no new MAC-d PDUs are received from any logic channels in step 802, then an empty MAC-e PDU is generated and processed in that loop of the process.

In an alternative embodiment, the start, terminate, and additional data determinations, i.e., steps 801, 813, and 812 of FIG. 8, are not performed, and instead, the operation of the process is controlled by MAC control entity 705 of FIG. 7.

Exemplary embodiments have been described using TS 25.321 terms and Release 7 of the 3GPP standard. However, the invention is not limited to TS 25.321, Release 7, or 3GPP implementations. The invention is applicable to any suitable communication standard adapted, as part of data transmission, to multiplex two or more transmission channels into a composite transmission channel, and to include a data packet retransmission mechanism.

Exemplary embodiments have been described wherein particular entities perform particular functions. However, the particular functions may be performed by any suitable entity and are not restricted to being performed by the particular entities named in the exemplary embodiments.

As used herein, the term "mobile phones" or "wireless devices" refers generically to mobile wireless telephony communication devices, and includes mobile communication devices that function as telephones, as well as mobile communication devices that do not necessarily function as telephones, e.g., a mobile device that transmits instant messages and downloads streaming audio, but is not adapted to be held up to a user's head for telephonic conversation.

As used herein, the term "cache" and its variants refer to a dynamic computer memory that is preferably (i) high-speed and (ii) adapted to have its present contents repeatedly overwritten with new data. To cache particular data, an entity can have a copy of that data stored in a determined location, or the entity can be made aware of the memory location where a copy of that data is already stored. Freeing a section of cached memory allows that section to be overwritten, making that section available for subsequent writing, but does not require erasing or changing the contents of that section.

As used herein in reference to data transfers between entities in the same device, and unless otherwise specified, the terms "receive" and its variants can refer to receipt of the actual data, or the receipt of one or more pointers to the actual data, wherein the receiving entity can access the actual data using the one or more pointers.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transferred energy.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

Signals and corresponding nodes or ports may be referred to by the same name and are interchangeable for purposes here.

We claim:

1. A method for data transmission in a communication network comprising a transmitter and a receiver, the method comprising:
   (a) caching in memory one or more first-type protocol data units (PDUs) received at a data link layer of the transmitter from a network layer of the transmitter;
   (b) selecting a first subset of the one or more first-type PDUs for combination into a second-type PDU;
   (c) generating the second-type PDU from the first subset of one or more selected first-type PDUs;
   (d) caching in memory a data structure adapted to allow regeneration of the second-type PDU, wherein the regeneration does not rely on any cached copy of the second-type PDU;
   (e) transmitting the second-type PDU via a physical layer of the transmitter for receipt by the receiver; and
   (f) determining whether the transmitter received an acknowledgement of successful receipt of the second-type PDU by the receiver, wherein:
      if the transmitter did not receive the acknowledgement of successful receipt, then the second-type PDU is re-generated using the cached data structure and the first subset of one or more selected first-type PDUs, and steps (e) and (f) are repeated; and
      if the transmitter did receive the acknowledgement of successful receipt, then the memory used to cache the data structure and the memory used to cache the first subset of one or more selected first-type PDUs are freed.

2. The method of claim 1, wherein the communication network is a wireless communication network.

3. The method of claim 2, wherein the first- and second-type PDUs conform to a third-generation (3G) wireless standard.

4. The method of claim 3, wherein the first-type PDU is a MAC-d PDU of the 3G wireless standard and the second-type PDU is a MAC-e PDU of the 3G wireless standard.

5. The method of claim 3, wherein the transmitter is part of a user equipment (UE) device of the 3G wireless standard and the receiver is part of a Node-B of the 3G wireless standard.

6. The method of claim 5, wherein the UE and the Node-B are compatible with a high-speed uplink packet access (HSUPA) protocol of the 3G wireless standard.

7. The method of claim 3, wherein step (f) is performed by a Hybrid Automatic Repeat Request (HARQ) entity of the 3G wireless standard located in the data link layer.

8. The method of claim 1, wherein step (c) is performed in the physical layer.

9. The method of claim 8, wherein step (c) comprises multiplexing and concatenating the first subset of one or more selected first-type PDUs into the second-type PDU.

10. The method of claim 9, wherein step (c) is performed by a baseband integrated circuit (IC) adapted to perform physical-layer functions of the transmitter.

11. The method of claim 8, wherein step (c) further comprises setting a transmission sequence number (TSN) for the second-type PDU.

12. The method of claim 1, wherein the cached data structure identifies memory addresses of the first subset of one or more selected first-type PDUs.

13. The method of claim 1, wherein the first subset of one or more selected first-type PDUs comprises first-type PDUs from multiple logical channels.

14. The method of claim 1, wherein the memory used to cache the data structure is distinct from the memory used to cache the one or more first-type PDUs.

15. The method of claim 1, wherein:
   the cached data structure identifies memory addresses of the first subset of one or more selected first-type PDUs;
   step (c) further comprises:
      setting a transmission sequence number (TSN) for the second-type PDU; and
      multiplexing and concatenating the first subset of one or more selected first-type PDUs into the second-type PDU;
   step (c) is performed in the physical layer by a baseband integrated circuit (IC) adapted to perform physical-layer functions of the transmitter;
   the communication network is a wireless communication network;
   the first- and second-type PDUs conform to a third-generation (3G) wireless standard;
   the first-type PDU is a MAC-d PDU of the 3G wireless standard and the second-type PDU is a MAC-e PDU of the 3G wireless standard;
   the transmitter is part of a user equipment (UE) device of the 3G wireless standard and the receiver is part of a Node-B of the 3G wireless standard;
   the UE and the Node-B are compatible with a high-speed uplink packet access (HSUPA) protocol of the 3G wireless standard; and
   step (f) is preformed by a Hybrid Automatic Repeat Request (HARQ) entity of the 3G wireless standard located in the data link layer.

16. A transmitter for a communication network further comprising a receiver, wherein the transmitter is adapted to:
   (a) cache in memory one or more first-type protocol data units (PDUs) received at a data link layer of the transmitter from a network layer of the transmitter;
   (b) select a first subset of the one or more first-type PDUs for combination into a second-type PDU;
   (c) generate the second-type PDU from the first subset of one or more selected first-type PDUs;
   (d) cache in memory a data structure adapted to allow re-generation of the second-type PDU, wherein the re-generation does not rely on any cached copy of the second-type PDU;
   (e) transmit the second-type PDU via a physical layer of the transmitter for receipt by the receiver; and
   (f) determine whether the transmitter received an acknowledgement of successful receipt of the second-type PDU by the receiver, wherein:
      if the transmitter did not receive the acknowledgement of successful receipt, then the second-type PDU is re-generated using the cached data structure and the first subset of one or more selected first-type PDUs, and steps (e) and (f) are repeated; and
      if the transmitter did receive the acknowledgement of successful receipt, then the memory used to cache the data structure and the memory used to cache the first subset of one or more selected first-type PDUs are freed.

17. A transmitter for a communication network further comprising a receiver, the transmitter comprising:
   (a) means for caching in memory one or more first-type protocol data units (PDUs) received at a data link layer of the transmitter from a network layer of the transmitter;
(b) means for selecting a first subset of the one or more first-type PDUs for combination into a second-type PDU;
(c) means for generating the second-type PDU from the first subset of one or more selected first-type PDUs;
(d) means for caching in memory a data structure adapted to allow re-generation of the second-type PDU, wherein the re-generation does not rely on any cached copy of the second-type PDU;
(e) means for transmitting the second-type PDU via a physical layer of the transmitter for receipt by the receiver; and
(f) means for determining whether the transmitter received an acknowledgement of successful receipt of the second-type PDU by the receiver, wherein:
if the transmitter did not receive the acknowledgement of successful receipt, then the second-type PDU is re-generated using the cached data structure and the first subset of one or more selected first-type PDUs, and steps (e) and (f) are repeated; and
if the transmitter did receive the acknowledgement of successful receipt, then the memory used to cache the data structure and the memory used to cache the first subset of one or more selected first-type PDUs are freed.

* * * * *